Oct. 9, 1934. E. Z. MUNZ 1,975,903
SPRAYING DEVICE
Filed Dec. 27, 1927
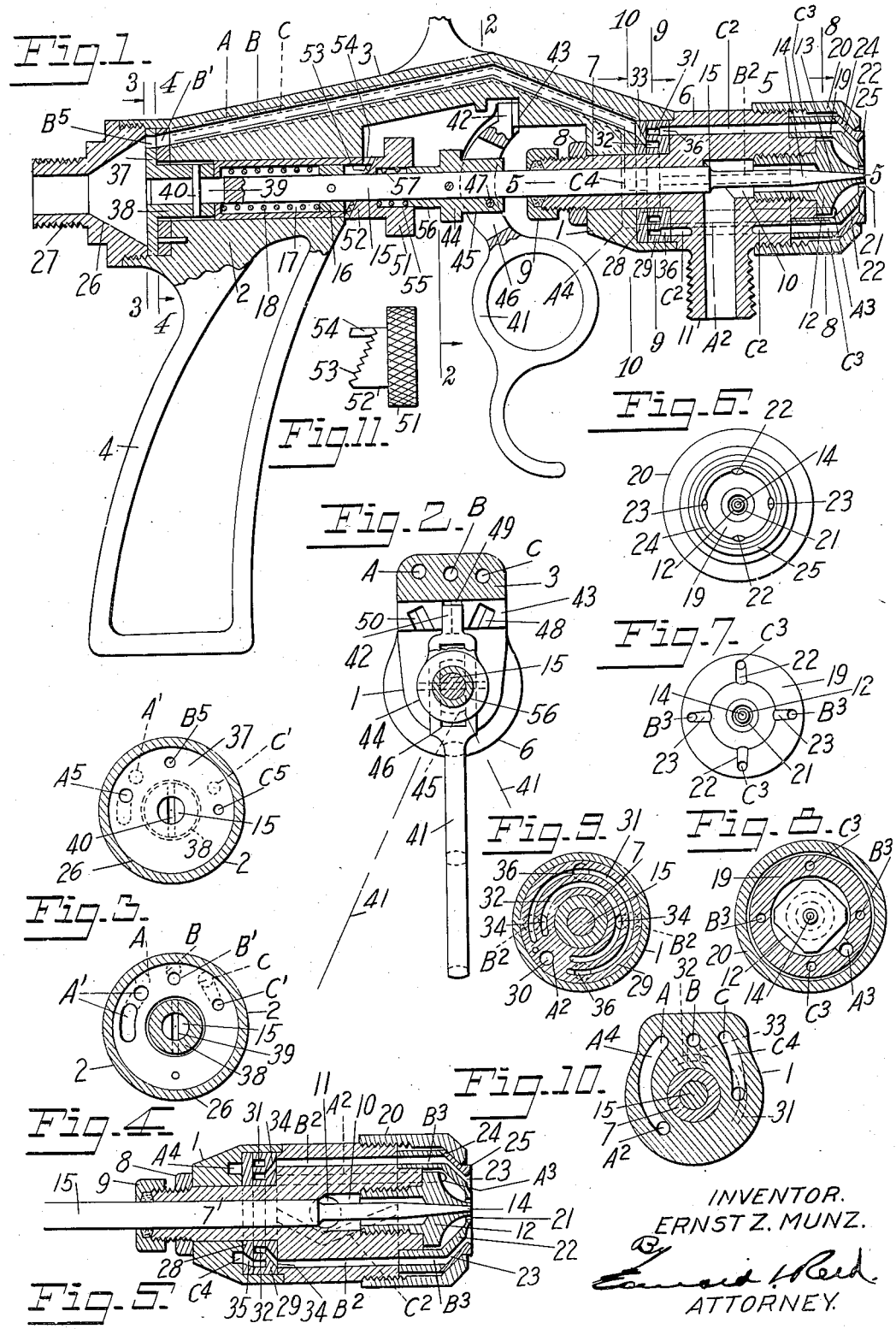
INVENTOR.
ERNST Z. MUNZ.
ATTORNEY.

Patented Oct. 9, 1934

1,975,903

UNITED STATES PATENT OFFICE 1,975,903

SPRAYING DEVICE

Ernst Z. Munz, Springfield, Ohio

Application December 27, 1927, Serial No. 242,575

20 Claims. (Cl. 91—45)

This invention relates to spraying devices and is designed more particularly for use with liquid paints.

One object of the invention is to provide a spraying device having means whereby the character and shape of the jet of atomized liquid may be controlled without adjustment of the spray head.

A further object of the invention is to provide such a spraying device having a single actuating device for controlling the flow of liquid and of air under pressure through the spray head and for controlling the character and shape of the jet of atomized liquid.

A further object of the invention is to provide means for positively positioning the liquid controlling valve of a spraying device.

A further object of the invention is to provide such a spraying device which will be simple in its construction and operation and in which the passageways will not be liable to be clogged with dry paint, or otherwise, but which may be easily cleansed should the passageways become obstructed.

Other objects of the invention will appear as the device is described in detail.

In the accompanying drawing Fig. 1 is a longitudinal sectional view taken vertically through a spraying device embodying my invention; Fig. 2 is a transverse section taken on the line 2—2 of Fig. 1, looking in the direction of the arrows; Fig. 3 is a transverse section taken on the line 3—3 of Fig. 1, looking in the direction of the arrows; Fig. 4 is a transverse section on the line 4—4 of Fig. 1, looking in the direction of the arrows; Fig. 5 is a horizontal section taken through the spray head on the line 5—5 of Fig. 1; Fig. 6 is a front elevation of the spray head; Fig. 7 is a front elevation of the cap or air nozzle with the guard removed; Fig. 8 is a transverse sectional view taken on the line 8—8 of Fig. 1, looking in the direction of the arrows; Fig. 9 is a transverse sectional view taken on the line 9—9 of Fig. 1, looking in the direction of the arrows; Fig. 10 is a transverse sectional view taken on the line 10—10 of Fig. 1, looking in the direction of the arrows; and Fig. 11 is a detail view of the adjustable stop.

In the drawing I have illustrated one embodiment of my invention and have shown the same as designed primarily for use with liquid paint but it will be understood that this embodiment has been chosen for the purpose of illustration only and that the device may take various forms and may be utilized for various purposes without departing from the spirit of the invention.

In the embodiment of the invention here illustrated the device comprises a main frame or supporting structure having a forward portion 1 and a rear portion 2, the front and rear portions being connected by an upper portion or bridge 3 which supports the front and rear parts in spaced relation. The rear portion of the structure is provided with a handle or "pistol grip" 4, by means of which the device may be manipulated, and the forward portion of the structure carries the spray head which is indicated as a whole by the reference numeral 5. The spray head is adapted to be connected with a source of supply for the liquid to be sprayed and with a source of supply for air under pressure and it is provided with liquid and air outlets so arranged as to cause the liquid to be discharged in the form of a jet of atomized liquid. It is further provided with air ports so arranged that they will discharge jets of air across the jet of atomized liquid in such a manner as to control the shape of the jet of atomized liquid. The flow of liquid and air through the spray head is controlled by an actuating device which is preferably arranged adjacent to the handle 4 and which may be manipulated to control the quantity of liquid discharged and to control the character and shape of the jet. The spray head here illustrated comprises a body portion 6 having a rearwardly extending tubular portion 7 which extends through an opening in the forward portion 1 of the supporting structure and has its rear end threaded to receive a nut 8 by means of which it is secured in position. It may also, if desired, be provided with a packing gland 9. The body portion of the spray head has a chamber or conduit 10 for the liquid, which is adapted to be connected through a lateral conduit 11 with a suitable source of supply for the liquid. The liquid may be delivered to the spray head in the usual or any suitable manner, as by air pressure or gravity. At its forward end the body portion 6 is provided with an outlet for the liquid and, as here shown, a nozzle 12 is mounted on the forward end of the body portion, preferably by screw threading the same into the forward end of the chamber 10. This nozzle has a tapered outlet opening 13 adapted to receive and to form a seat for a needle valve 14 which is carried by a stem 15 slidably mounted in the tubular portion 7 of the body portion of the head and which extends rearwardly therefrom and is supported at its rear end in the rear portion 2 of the supporting structure. As here shown, the rear portion of the stem has secured thereto a collar 16 which is slidably mounted in a guideway 17 in the rear portion of the supporting structure and a spring 18 acts upon the collar 16 to move the same forwardly and seat the valve. The forward portion of the nozzle 12 is tapered and the nozzle as a whole is enclosed within a cap or air nozzle 19 which is here shown as fitting about a reduced portion at the forward end of the body of the spray and is secured thereto by a coupling member 20 screw threaded onto the body. The forward portion of the air nozzle or cap 19 is in the form of a frustum of a cone and has in its front wall an air outlet 21 into which the tapered forward end of the liquid nozzle 12 extends. The air outlet is of a diameter slightly greater than the exterior diameter of the forward end of the liquid nozzle so as to provide about the end of the liquid nozzle an air passage through which air under pressure may be discharged to create a suction in the outlet opening 13 of the liquid nozzle and thus draw the liquid from the chamber 10 and cause the same to be discharged in the form of a jet of atomized liquid. The inclined forward portion of the air nozzle is spaced some distance from the tapered wall of the liquid nozzle so as to form between these parts an air chamber which receives air under pressure from a suitable source of supply, as will be hereinafter described, and causes it to be discharged equally on all sides of the liquid nozzle.

The discharge of air through the air outlet 21 will cause the atomized liquid to be discharged in the form of a round or conical jet and as it is often desirable, particularly in painting, that the jet should be of a flat shape I have provided means for modifying the shape of the jet. In the present construction this is accomplished by providing the air nozzle with auxiliary air ports 22 and 23 which are so arranged that they will discharge jets of air obliquely to the jet of atomized liquid. It will be noted that the auxiliary air outlets are arranged in pairs. The outlets 22 being arranged above and below the main air outlet 21 and so inclined that the jets of air therefrom will intersect one with the other directly in front of and in line with the main air outlet and will serve to flatten out the jet and cause the same to assume a flat horizontal shape. The auxiliary air ports 23 are arranged on the opposite sides of the main air outlet and converge toward the jet of atomized liquid so that the jets of air therefrom will cause the jet of atomized liquid to assume the form of a flat vertical jet. In the present construction, the auxiliary ports are provided by forming grooves in the conical outer surface of the cap or air nozzle 19, the outer faces of these grooves being closed by a guard 24 which is held in position thereon by means of the coupling 20. Preferably the edge of the guard is provided with small recesses which register with the respective grooves in the cap, the recesses in the guard and the grooves being so shaped that the outlet ports will be elongated or elliptical, thus imparting to each air jet a width equal to or slightly greater than the diameter of the jet of atomized liquid at the main outlet. The guard is in the form of a frustum of a cone and terminates with its forward end adjacent to the forward ends of the grooves in the air nozzle 19 and is there provided with a forwardly extending flange 25 which serves to protect the outlet openings from injury.

The operation of the spray device as a whole is controlled by controlling the flow of air under pressure to the main air outlet 21. The character or shape of the atomized liquid is controlled by controlling the flow of air to the auxiliary air outlets 22 and 23, it being understood that air may be delivered to the main outlet independently of the auxiliary outlets or that air may be delivered simultaneously to the main outlet and one pair of auxiliary outlets. The means for controlling the flow of air to the several outlets is independent of the spray head itself and consequently this spray head has no parts that are adjustable or movable for the purpose of controlling the operation of the device, with the exception of the needle valve 14 for controlling the flow of liquid, and this needle valve is operated from a point remote from the spray head. In the present device the rear portion 2 of the supporting structure has an air chamber 26 having means, such as a threaded nipple 27 for connecting the same with a source of supply for air under pressure. Leading from this air chamber 26 is a main air conduit A which opens into the air chamber through an elongated port A', the port being here shown as comprising two parts. The conduit A extends forwardly through the upper portion or bridge 3 of the supporting structure and is connected at its forward end with a conduit $A^2$ formed in the lower portion of the body of the spray head and communicating at its forward end with a port or conduit $A^3$ in the cylindrical wall of the nozzle or cap 19, the forward end of this port $A^3$ opening into the air chamber between the air nozzle and the liquid nozzle, so that whenever any part of the inlet port A' of the conduit A is in communication with the air chamber 26 a supply of air under pressure will be delivered to the air nozzle. A second air conduit B opens into the air chamber 26 through a port B' and leads forwardly through the upper portion of the supporting structure to the forward end thereof where it is divided into two branches, in a manner to be hereinafter described, which communicate with conduits $B^2$ in the opposite sides of the body portion of the spray head and which communicate at their forward ends with passageways $B^3$ in the air nozzle or cap 19, which passageways lead to the lateral auxiliary air ports 23. A third conduit C communicates with the air chamber 26 through a port C' and extends forwardly through the upper portion of the supporting structure to the forward end thereof where it also is divided into two branches which communicate with conduits $C^2$ formed in the upper and lower portions of the body portion of the spray head. The conduits $C^2$ communicate at their forward ends with upper and lower passageways $C^3$ formed in the cylindrical portion of the air nozzle or cap 19 and leading to the upper and lower auxiliary ports 22.

The conduits A, B and C, in the supporting structure, may be connected with the corresponding conduits in the body of the spray head in any suitable manner but, in the present instance, I have mounted in the forward portion of the supporting structure two disks 28 and 29 which are confined between the rear end of the body portion 6 of the spray head and the forward portion of the supporting structure and are apertured to receive the tubular portion 7 of the body of the spray head. These disks have alined openings 30, the opening in the rear disk 28 communicating with the main passageway A in the supporting structure by means of a groove $A^4$ formed in the front wall of the supporting structure, as shown in Fig. 10. The opening in the forward disk 29 communicates with the passageway $A^2$ through the body of the spray head. The forward disk 29 has in its rear face two concentric grooves 31 and 32. The rear disk 28 has an opening 33 connecting the conduit B with the inner groove 32 and the forward disk 29 is provided on each side thereof with a port 34 leading from the groove 32 to the lateral conduits $B^2$ in the body of the spray head. The forward disk 28 has an opening or port 35 which communicates with a groove $C^4$ at the forward end of the supporting structure and is connected thereby with the conduit C. This port 35 also communicates with the outer groove 31 in the disk 29 and this outer groove is connected by ports 36 with the upper and lower conduits $C^2$ in the spray head. Thus the disks 28 and 29 constitute a distributor by means of which air from the supply conduits is distributed to the auxiliary ports.

The flow of air through the conduits A, B and C, is controlled by a distributing valve in the air chamber 26 and this valve is here shown in the form of a disk 37 having three ports $A^5$, $B^5$ and $C^5$. By rotating the disk 37 the port $B^5$ of the valve member may be moved into and out of alinement with the port B' of the conduit B and the port $C^5$ may be moved into and out of alinement with the port C' of the conduit C. The ports $B^5$ and $C^5$ are so arranged that they cannot simultaneously communicate with their respective conduits and the elongated port A' for the supply conduit A enables the valve port $A^5$ to communicate with that conduit when either the port $B^5$ or $C^5$ is in communication with its conduit or when both of said ports are out of communication with said conduits. Thus by a proper positioning of the distributing valve 37 air can be delivered to the main air outlet 21 of the spray head alone or simultaneously with the delivery of air to either pair of auxiliary air outlets 22 or 23. The distributing valve may also be moved to a position to close all three ports and thus interrupt the delivery of air to the spray head. I prefer to control the distributing valve 37 through the medium of the stem 15 of the liquid valve 14 and to this end the valve disk 37 is provided with a hollow boss 38 to receive the rear end of the valve stem and the valve stem is slotted, as shown at 39 to embrace a pin 40 extending through the hollow boss, thereby causing the valve disk to rotate with the valve stem but permitting the valve stem to have longitudinal movement with relation to the disk. Any suitable means may be provided for imparting the necessary movements to the valve stem to control the operation of the spray head but, in the present construction, I have utilized a lever or trigger 41 which is pivotally supported between its ends on the valve stem 15 and has its upper end, 42, arranged to fulcrum upon a shoulder 43 in the upper or bridge portion 3 of the supporting structure, so that rearward pressure on the lower portion of the trigger will retract the valve stem 15 against the action of its spring 18. The trigger is so connected with the valve stem that when lateral movement is imparted to the lower portion of the trigger the valve stem will be rotated. To this end I have rigidly secured to the valve stem a sleeve 44, the forward portion 45 of which is flattened at its sides and extends into a slot 46 in the trigger, a pivot pin 47 extending through the trigger and through the lower portion of the flattened sleeve. The shoulder 43 upon which the trigger fulcrums is preferably provided with recesses 48, 49 and 50 in which the upper end of the trigger may be seated to hold the same normally against lateral movement. These recesses are so arranged that when the trigger is seated in the right hand recess, 48, of Fig. 2, the distributing valve will be so positioned that air will be delivered to the main outlet port 21 only. When the trigger is in its intermediate position, in the recess 49, air will be delivered both to the main air outlet 21 and to the lateral auxiliary outlets 23 and when the trigger is in engagement with the left hand recess 50 air will be delivered to both the main outlet port 21 and the upper and lower auxiliary ports 22. By moving the trigger laterally to such an extent that the upper portion 42 thereof will be moved beyond the right hand recess 48 in Fig. 2 the port $A^5$ of the valve will be carried out of line with the conduit A and all flow of air to the spray head interrupted. It will be noted that the trigger may be operated to impart longitudinal movement to the valve stem and thus open the liquid outlet 13 when it is an any one of its three adjusted positions.

In spraying operations and more particularly in painting, it is highly desirable that a spray of uniform volume be discharged from the spray head and where the position of the outlet valve for the liquid depends wholly upon the pressure of the finger of the operator upon the trigger it is exceedingly difficult to maintain a uniform flow of paint. In the present device, I have provided an adjustable stop which will positively limit the rearward movement of the valve stem and by adjusting this stop to the desired position and then pressing the trigger rearwardly as far as it will go the liquid valve 14 is positively retained in the desired position. As here shown, this stop is in the form of a collar 51 rotatably mounted about the valve stem 15 and having a rearwardly extending hub portion 52 the rear face of which extends obliquely to the axis of the valve stem and is serrated as shown at 53. A lug or projection 54 extends forwardly from the supporting structure to engage the serrated face of the stop collar. The stop collar has a forwardly opening recess 55 into which extends the reduced rear end portion 56 of the sleeve 44. A spring 57 confined between the end of the sleeve and the base of the recess 55 serves to press the inclined face of the stop collar against the projection 54. The base of the recess forms a positive stop for the end of the sleeve and therefore for the valve stem and when the valve stem has been retracted to such an extent that the spring 57 is fully compressed its movement is positively checked. By rotating the stop collar to cause different portions of the inclined face thereof to engage the projection 54 the amount of movement which may be imparted to the valve stem may be varied, thereby enabling the stop to be so adjusted that the valve 14 can be opened only to such an extent to permit a predetermined discharge of liquid.

A further advantage of the device is the ease with which dry paint or the like may be removed from the liquid outlet. By pressing the lower end of the trigger forward to release the same from the recesses in the bridge 3, the valve stem may be rocked back and forth while the spring presses the valve toward its seat, thus grinding out any accumulations of paint in the outlet or in the valve.

While I have shown and described one embodiment of my invention I wish it to be understood that I do not desire to be limited to the details thereof as various modifications may occur to a person skilled in the art.

Having now fully described my invention, what

I claim as new and desire to secure by Letters Patent, is:

1. In a spraying device, a spray head adapted to be connected with a source of supply for liquid and with a source of supply for air under pressure, having a main air outlet arranged to cause a jet of atomized liquid to be discharged from said spray head and also having auxiliary air outlets arranged to control the shape of said jet of liquid, means for selectively controlling said main air outlet and said auxiliary air outlets, and a single actuating device for said controlling means which is operable to cause air from said source of supply to be delivered either to said main air outlet alone or to said main air outlet and said auxiliary air outlets.

2. In a spraying device, a spray head adapted to be connected with a source of supply for liquid and with a source of supply for air under pressure, having a main air outlet arranged to cause a jet of atomized liquid to be discharged from said spray head and also having auxiliary air outlets arranged to control the shape of said jet of atomized liquid, a handle for manipulating said spray head, and a device arranged to be actuated by the hand which grasps said handle for selectively controlling the discharge of air through said auxiliary outlets.

3. In a spraying device, a spray head adapted to be connected with a source of supply for liquid and with a source of supply for air under pressure, having a main air outlet arranged to cause a jet of atomized liquid to be discharged from said spray head and also having auxiliary air outlets arranged to control the shape of said jet of atomized liquid, a single distributing valve to selectively control the flow of air to said main outlet and said auxiliary outlets, and means for adjusting said distributing valve.

4. In a spraying device, a spray head adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, separate means for controlling said outlet for liquid and for selectively controlling all of said outlets for air, and a single device for actuating both controlling means.

5. In a spraying device, a spray head adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, separate valves for controlling said outlet for liquid and said outlets for air, and a device having movement in one direction to actuate the liquid controlling valve and having movement in another direction to separately actuate the air controlling valve.

6. In a spraying device, a spray head adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a valve to control the discharge of liquid through said liquid outlet, a second valve to control the flow of air to said auxiliary outlets, and an actuating device adjustable to different positions to adjust said second valve and operable while in any one of its adjusted positions to actuate the first mentioned valve.

7. In a spraying device, a spray head adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a longitudinally movable valve to control the flow of liquid through said air outlet, a rotatable valve to control the delivery of air to said air outlets, and a lever so connected with both valves that when moved in one direction it will actuate said longitudinally movable valve and when moved in another direction it will actuate said rotatable valve.

8. In a spraying device, a spray head adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a longitudinally movable valve to control the discharge of liquid through said liquid outlet, a stem connected with said valve and capable of both reciprocatory and rotatory movement, a rotatable valve connected with said valve stem to control the delivery of air to said air outlets, and a lever pivotally supported by said valve stem and having one end arranged to fulcrum on a fixed part of said spraying device, said lever being connected with said valve stem for imparting either longitudinal or rotatory movement thereto.

9. In a spraying device, a supporting structure, a spray head carried by said structure, adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a longitudinally movable valve to control the discharge of liquid through said liquid outlet, a stem connected with said valve and mounted in said supporting structure for both rotatory and reciprocatory movement, a spring acting on said valve stem to move said valve toward its closed position, a rotatory valve to control the discharge of air to said air outlets, means for so connecting said rotatory valve with said valve stem as to cause the same to rotate with said valve stem but to permit said valve stem to have longitudinal movement with relation thereto, a lever pivotally supported on said valve stem and having one end arranged to fulcrum on a part of said supporting structure, said lever being so connected with said valve stem as to cause the valve stem to move therewith when said lever is moved about the axis of said valve stem, whereby said lever may be moved about the axis of said valve stem to adjust said rotatory valve to a selected position and then moved about said fulcrum to open said longitudinally movable valve.

10. In a spraying device, a supporting structure, a spray head carried by said structure, adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a longitudinally movable valve to control the discharge of liquid through said liquid outlet, a stem connected with said valve and mounted in said supporting structure for both rotatory and reciprocatory movement, a spring acting on said valve stem to move said valve toward its closed position, a rotatory valve to control the discharge of air to said air outlets, means for so connecting said rotatory valve with said valve stem as to cause the same to rotate with said valve stem but to permit said valve stem to have longitudinal movement with relation thereto, a lever pivotally supported on said valve stem, having one end arranged to fulcrum on a part of said supporting structure, said lever being so connected with said valve stem as to cause the valve stem to move therewith when said lever is moved about the axis of said valve stem, whereby said lever may be moved about the axis of said valve stem to adjust said rotatory valve to a selected position and then moved about said fulcrum to open said longitudinally movable valve, and an adjustable stop to positively limit the opening movement imparted to said longitudinally movable valve by said lever.

11. In a spraying device, a supporting structure, a spray head carried by said structure, adapted to be connected with a source of supply for liquid and with a source of supply of air under pressure and having an outlet for liquid and an outlet for air arranged to cause a jet of atomized liquid to be discharged from said spray head, said spray head also having auxiliary air outlets to control the shape of said jet of atomized liquid, a valve to control the flow of liquid through said liquid outlet, separate conduits leading from the respective air outlets to the rear end of said supporting structure, a valve arranged at the rear end of said supporting structure to selectively control the flow of air through said conduits, and an actuating device connected with both of said valves.

12. In a spraying device, a supporting structure, a spray head carried by said structure, adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a valve to control the flow of liquid through said liquid outlet, separate conduits leading from the respective air outlets to the rear end of said supporting structure, a valve arranged at the rear end of said supporting structure to selectively control the flow of air through said conduits, a lever operatively connected with both of said valves and having movement in different directions to separately operate the respective valves, and an adjustable device to positively limit the movement of said lever in a direction to actuate the first mentioned valve.

13. In a spraying device, a supporting structure, a spray head carried by said structure, adapted to be connected with a source of supply for liquid and with a source of supply for air under pressure and having an outlet for liquid and an outlet for air arranged to cause a jet of atomized liquid to be discharged from said spray head, said spray head also having auxiliary air outlets to control the shape of said jet of atomized liquid, a valve to control the flow of liquid through said liquid outlet, separate conduits leading from the respective air outlets to the rear end of said supporting structure, a valve arranged at the rear end of said supporting structure to selectively control the flow of air through said conduits, and a lever operatively connected with both of said valves and having movement in different directions to separately operate the respective valves.

14. In a spraying device, a spray head adapted to be connected with a source of supply for liquid and with a source of supply for air under pressure and having an outlet for liquid and an outlet for air arranged to cause a jet of atomized liquid to be discharged from said spray head, means for controlling the flow of air to said air outlet, a longitudinally movable valve to control the flow of liquid through said liquid outlet, a valve stem connected with said valve, a spring acting on said stem to move said valve toward its closed position, a lever acting on said stem to move said valve to its open position, a stop rotatably and slidably mounted on said valve stem and having one face extending obliquely to the axis of said valve stem, a fixed part to engage the oblique face of said rotatable stop, and a part carried by said valve stem to engage said stop and interrupt the movement of said valve against the action of said spring.

15. In a spraying device, a spray head comprising a body portion having a liquid chamber adapted to be connected with a source of supply for liquid, a liquid discharge nozzle communicating with said chamber and having a tapered forward end, a valve to control the flow of liquid through said nozzle, an air nozzle mounted about said liquid nozzle and arranged to provide an air chamber between said nozzles and having an air outlet surrounding the forward end of said liquid nozzle, said air nozzle having converging auxiliary air ports arranged on opposite sides of said main air outlet, and a single device for selectively controlling the flow of air to said air chamber and to said auxiliary air ports.

16. In a spraying device, a supporting structure, a spray head carried by said structure and comprising a body portion having a liquid chamber to communicate with a source of supply for liquid, a liquid nozzle communicating with said liquid chamber and having a tapered forward end, a valve to control the flow of liquid through said nozzle, a cap mounted on said body portion, extending about said liquid nozzle and having forwardly converging walls spaced from the tapered end of said nozzle to provide an air chamber, said cap having at its forward end an opening to receive the end of said liquid nozzle and to provide an air outlet about the same, said cap also having converging air ports arranged on the opposite sides of said air outlet, conduits extending through the body portion of said spray head and connected with said air outlet and with said auxiliary air ports, respectively, supply conduits extending through said supporting structure, one of said supply conduits being connected with the conduit in said spray head to said air chamber, means for distributing air from another of said conduits to the conduits in said spray head leading to said auxiliary air ports, and a single valve to control the flow of air through the conduits in said supporting structure.

17. In a spraying device, a supporting structure, a spray head carried by said structure and comprising a body portion, a liquid nozzle mounted in said body portion, means for connecting said nozzle with a source of supply for liquid, a valve to control said liquid nozzle, a cap mounted on said body portion, extending about said liquid nozzle and having forwardly converging walls spaced about the end of said nozzle to provide an air chamber, said body portion having a conduit to connect said air chamber with a source of supply for air under pressure, said cap having at its forward end an opening to receive the end of said liquid nozzle and provide an outlet about the same, said cap having a frusto-conical outer surface provided with grooves converging toward the longitudinal center line of said spray head and having conduits leading from said grooves to a source of air supply separate from said air chamber, a frusto-conical guard mounted about said cap to close the outer sides of said grooves and convert the same into air discharge ports, a coupling member engaging said guard and detachably connected with said body portion and means for controlling the delivery of air to said conduits.

18. In a spraying device, a supporting structure, a spray head carried by said structure and comprising a body portion, a liquid nozzle mounted in said body portion, means for connecting said nozzle with a source of supply for liquid, a valve to control said liquid nozzle, a cap mounted on said body portion, extending about said liquid nozzle and having forwardly converging walls spaced about the ends of said nozzle to provide an air chamber, said body portion having a conduit to connect said air chamber with a source of supply for air under pressure, said cap having at its forward end an opening to receive the end of said liquid nozzle and provide an outlet about the same, said cap having a frusto conical outer surface provided with grooves converging toward the longitudinal center line of said spray head and having conduits leading from said grooves to a source of air supply separate from said air chamber, a frusto conical guard mounted about said cap to close the outer sides of said grooves and convert the same into forwardly converging air discharge ports, a coupling member engaging said guard and secured to said body portion, said guard having at its forward end a forwardly extending flange, and means for controlling the supply of air to said conduits.

19. In a spraying device, a spray head adapted to be connected with a source of supply for liquid and with a source of supply for air under pressure, having a main air outlet arranged to cause a jet of atomized liquid to be discharged from said spray head, and also having auxiliary air ports arranged to control the shape of said jet of atomized liquid, a handle for manipulating said spray head, and a single device arranged adjacent to said handle to control the connection of said main outlet with said source of air supply and to selectively control the connection of said auxiliary outlets with said source of air supply.

20. In a spraying device, a supporting structure having three air conduits, means for controlling the flow of air through said conduits, a spray head carried by said supporting structure and having an outlet for liquid, means for connecting said outlet with a source of supply for liquid and for controlling said connection, said spray head also having a main air outlet arranged to cause a jet of liquid to be discharged from said liquid outlet, two pairs of auxiliary air outlets to control the shape of said jet, separate air conduits leading from the rear end of said spray head to the respective air outlets, a distributor interposed between said air conduits in said supporting structure and said air conduit in said spray head and having a passageway therethrough to connect one of said conduits in said supporting structure with the conduit in said spray head which leads to said main air outlet, said distributor also having two separate internal channels, a port in the rear wall thereof to connect one of said channels with a second conduit in said supporting structure, and two ports in the front wall thereof to connect said channel with the conduits in said spray head which lead to the respective outlets of one pair of auxiliary air outlets, said distributor also having a port in the rear wall thereof to connect the other channel with a third conduit in said supporting structure and having two ports in the front wall thereof to connect the last mentioned channel with the conduits in said spray head which lead to the respective outlets in the other pair of auxiliary outlets.

ERNST Z. MUNZ.